United States Patent
Shor

(10) Patent No.: US 9,639,133 B2
(45) Date of Patent: May 2, 2017

(54) ACCURATE POWER-ON DETECTOR

(71) Applicant: Joseph Shor, Yakum (IL)

(72) Inventor: Joseph Shor, Yakum (IL)

(73) Assignee: Intel Corporation, Santa Clara, CA (US)

(*) Notice: Subject to any disclaimer, the term of this patent is extended or adjusted under 35 U.S.C. 154(b) by 512 days.

(21) Appl. No.: 14/108,031

(22) Filed: Dec. 16, 2013

(65) Prior Publication Data
US 2015/0168969 A1   Jun. 18, 2015

(51) Int. Cl.
*G06F 1/28* (2006.01)
*G05F 3/30* (2006.01)
*G05F 1/46* (2006.01)

(52) U.S. Cl.
CPC .................. *G06F 1/28* (2013.01); *G05F 3/30* (2013.01); *G05F 1/468* (2013.01)

(58) Field of Classification Search
CPC .................................. G06F 1/28; G05F 1/468
See application file for complete search history.

(56) References Cited

U.S. PATENT DOCUMENTS

| 7,274,250 | B2 | 9/2007 | Hazucha et al. | |
|---|---|---|---|---|
| 7,969,211 | B2* | 6/2011 | Huang | G06F 1/24 327/143 |
| 2006/0132114 | A1* | 6/2006 | Giduturi | G11C 5/147 323/313 |
| 2006/0176032 | A1* | 8/2006 | Malherbe | G06K 19/073 323/268 |
| 2008/0239837 | A1* | 10/2008 | Kumazaki | G11C 5/145 365/189.09 |
| 2012/0280732 | A1* | 11/2012 | Roytman | H03K 5/086 327/175 |

* cited by examiner

*Primary Examiner* — Paul Yanchus, III
*Assistant Examiner* — Brandon Kinsey
(74) *Attorney, Agent, or Firm* — Blakely, Sokoloff, Taylor & Zafman LLP

(57) ABSTRACT

Described is an apparatus which comprises: an input for providing a first voltage signal; a level translator, coupled to the input, to translate the first voltage signal to a second input voltage, the second input voltage having a voltage level higher than a voltage level of the first voltage signal; and an open loop reference core coupled to the level translator, the open loop reference core to receive the second input voltage and to generate an output indicating whether the first voltage signal is above or below a reference level.

18 Claims, 6 Drawing Sheets

ACCURATE POWER-ON DETECTOR

BACKGROUND

A bandgap reference generator is used to generate a constant bandgap reference voltage. This constant bandgap reference voltage may be temperature independent and can be used for different applications. For example, the constant bandgap reference voltage may be used in digital-to-analog converters (DACs), phase locked loops (PLLs), linear voltage regulators (VRs), DC-DC converters, RF circuits, etc.

A bandgap reference generator when configured to operate as a power-on detector may not detect lower power supply levels which are lower than diode turn-on voltages.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
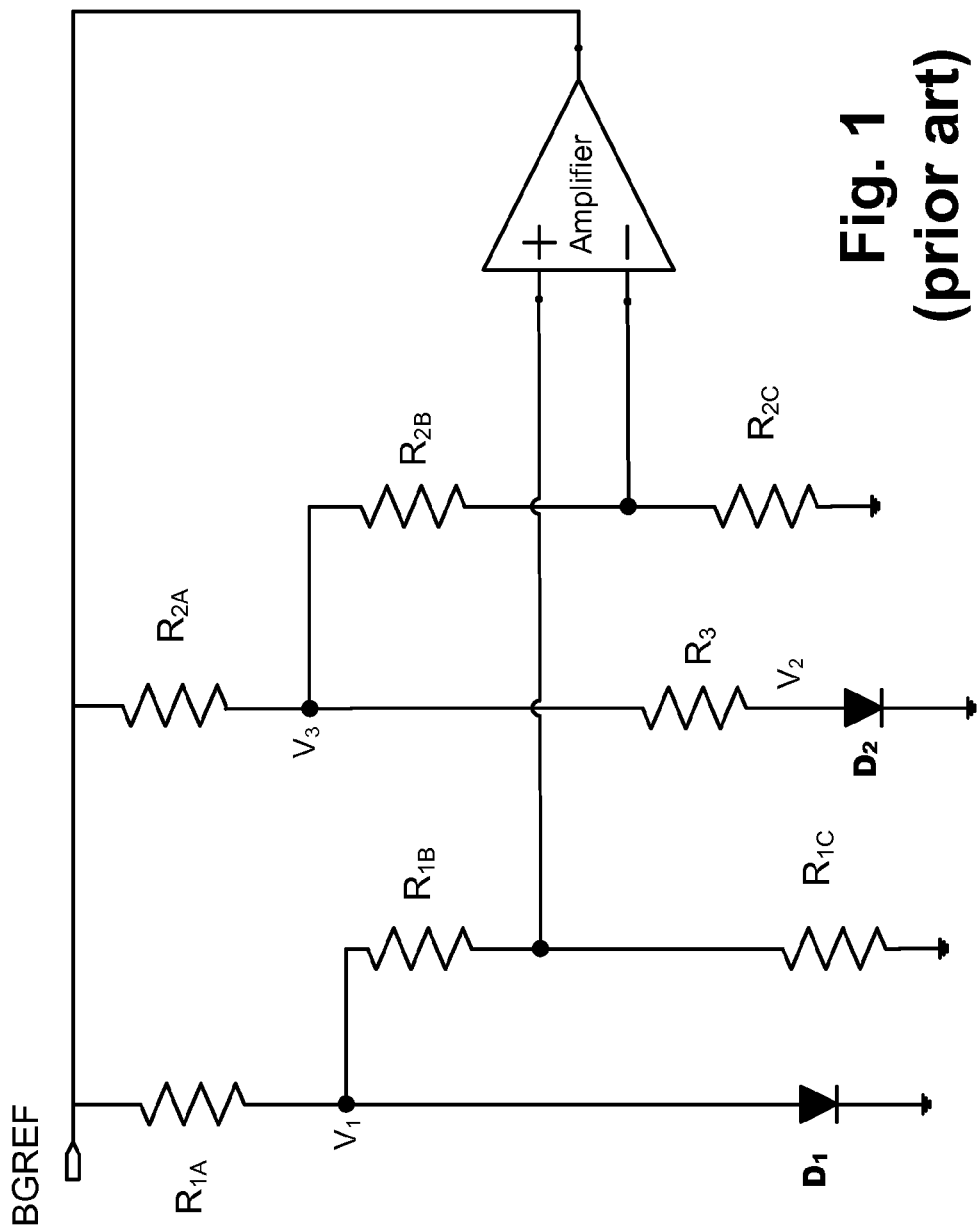
FIG. 1 illustrates a traditional bandgap reference generating architecture.

FIG. 1 illustrates a traditional bandgap reference generating architecture 100. Architecture (or Circuit) 100 uses one operational amplifier (Amplifier), up to seven resistors ($R_{1A}$, $R_{1B}$, $R_{1C}$, $R_{2A}$, $R_{2B}$, $R_{2C}$, and $R_3$), and two components with an exponential dependency of current on voltage, shown as diodes $D_1$ and $D_2$. Resistors $R_{1A}$, $R_{1B}$, and $R_{1C}$ operate to bias diode $D_1$ at a first point of its range, while resistors $R_{2A}$, $R_{2B}$, $R_{2C}$ and $R_3$ bias diode $D_1$ at a second point of its range. Resistors $R_{1B}$ and $R_{1C}$ form a voltage divider to produce a voltage proportional to $V_1$, the voltage across diode $D_1$. Resistors $R_{2B}$ and $R_{2C}$ form a voltage divider to produce a voltage proportional to $V_3$, the voltage across diode $D_2$ and resistor $R_3$. The Amplifier is an active component that compares the voltages of the two voltage dividers and produces an output signal that, because of the feedback loop in the circuit, is a temperature-independent reference voltage whose value is set according to the selection of the resistors.

The Amplifier of Circuit 100 regulates the BGREF (bandgap reference) voltage and resistor/diode matrix. For a certain configuration of the resistors and diodes, when inputs to the Amplifier are equal, BGREF is generated to be a fixed voltage which is temperature dependent. Circuit 100 can operate, theoretically, up to supply voltages as low as the turn-on voltage of the diodes $D_1$ and $D_2$. This means that Circuit 100 is not adapted to detect power supplies lower than diode voltages.

The embodiments describe an accurate power-on detector (e.g., accurate to a few milli-volts or micro volts) which can sense an input reference (e.g., an input power supply) at low voltages (e.g., 0.5V) which is lower than diode turn-on voltages. In one embodiment, an apparatus is provided which comprises an input for providing a first voltage signal (e.g., a power supply signal or a reference signal that is being sensed). In one embodiment, the apparatus further comprises a level translator, coupled to the input, to translate the first voltage signal to a second input voltage, where the second input voltage has a voltage level higher than a voltage level of the first voltage signal. In this embodiment, the second input voltage level is translated to a voltage equal or higher than the diode turn on voltage (e.g., translated to 0.8V or higher).

In one embodiment, the apparatus further comprises an open loop reference core (e.g., an open loop version of Circuit 100) coupled to the level translator. In one embodiment, the open loop reference core receives the second input voltage and generates an output indicating whether the first voltage signal is above or below a reference level. In one embodiment, an amplifier of a comparator of the open loop reference core includes offset cancellation and gain enhancement to enable low voltage operation (e.g., 0.5V).

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 2:
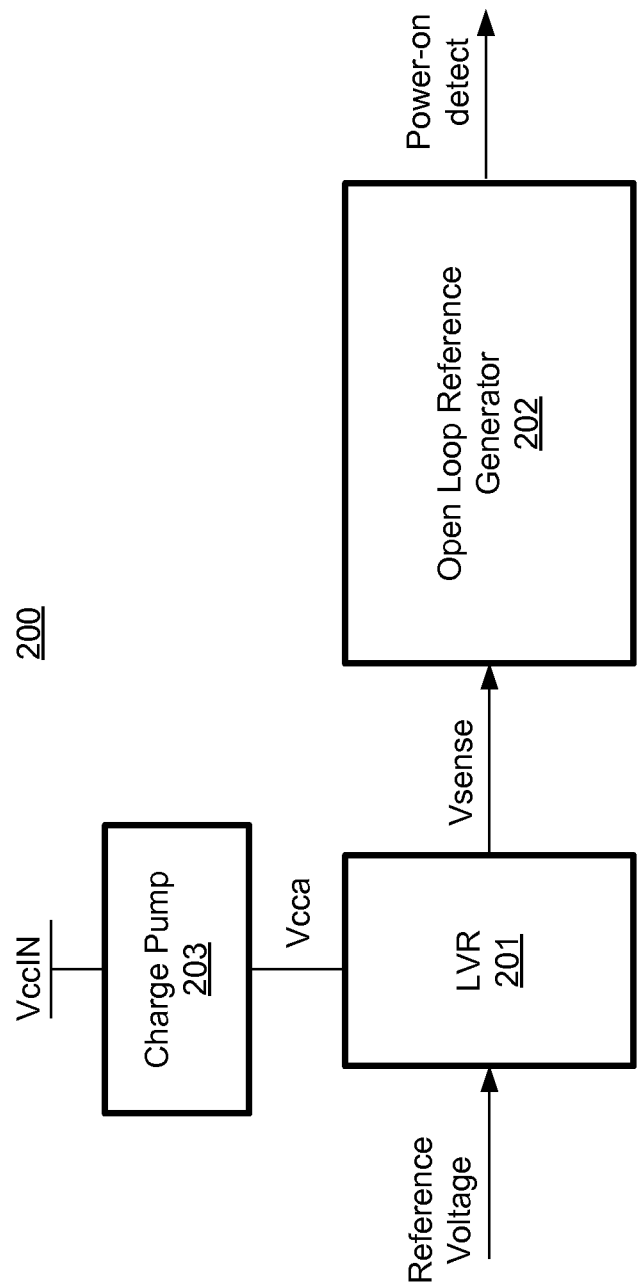
FIG. 2 illustrates a high level architecture of a signal level detector with a level translator and an open loop bandgap reference circuit, according to one embodiment of the disclosure.

FIG. 2 illustrates a high level architecture 200 of a signal level detector with a level translator and an open loop bandgap reference circuit, according to one embodiment of the disclosure. It is pointed out that those elements of FIG. 2 having the same reference numbers (or names) as the elements of any other figure can operate or function in any manner similar to that described, but are not limited to such.

In one embodiment, architecture 200 comprises Voltage Level Translator 201, Open Loop Reference Generator 202, and Charge Pump 203. In one embodiment, Voltage Level Translator 201 is a low dropout (LDO) voltage regulator or linear voltage regulator (LVR) which is operable to receive an input signal (i.e., Reference Voltage) and translate it to a higher level Vsense signal. Here, labels for signals and nodes are interchangeably used. For example, Vsense is used to indicate Vsense signal or Vsense node depending on the context of the sentence. In one embodiment, Voltage Level Translator 201 raises the Reference Voltage to Vsense by a predetermined amount or percentage. In one embodiment, this predetermined amount or percentage depends on a ratio of resistances.

In one embodiment, Open Loop Reference Generator 202 receives Vsense from Voltage Level Translator 201 and generates an output Power-on detect signal. In one embodiment, Open Loop Reference Generator 202 comprises a circuit similar to Circuit 100 but in open loop configuration. In one embodiment, Amplifier of Circuit 100 when used in open loop configuration is replaced with a comparator. In one embodiment, the comparator includes offset cancellation apparatus. In one embodiment, the comparator operates on a low power supply e.g., of voltage level substantially equal to Reference Voltage.

In one embodiment, Reference Voltage is a power supply to a memory unit. For example, a memory unit may operate on minimum Vcc voltage (MinVcc) to consume low power while sustaining data in the memory unit. In this example, architecture 200 can be used to detect the voltage level of MinVcc, which can be lower than diode turn-on voltage (e.g., 0.8V), to identify whether the power supply to the memory unit is operating at its MinVcc level instead of a higher voltage level (which may lead to higher power consumption).

In one embodiment, Charge Pump 203 receives input power supply VccIN and generates an output supply Vcca. In one embodiment, Vcca is two to three times higher than VccIN. In one embodiment, Charge Pump 203 is removed and a higher power supply is directly provided as Vcca. One reason for providing a higher power supply to Voltage Level Translator 201 is to generate a higher Vsense voltage to provide head room for Open Loop Reference Generator 202.

Figure 3:
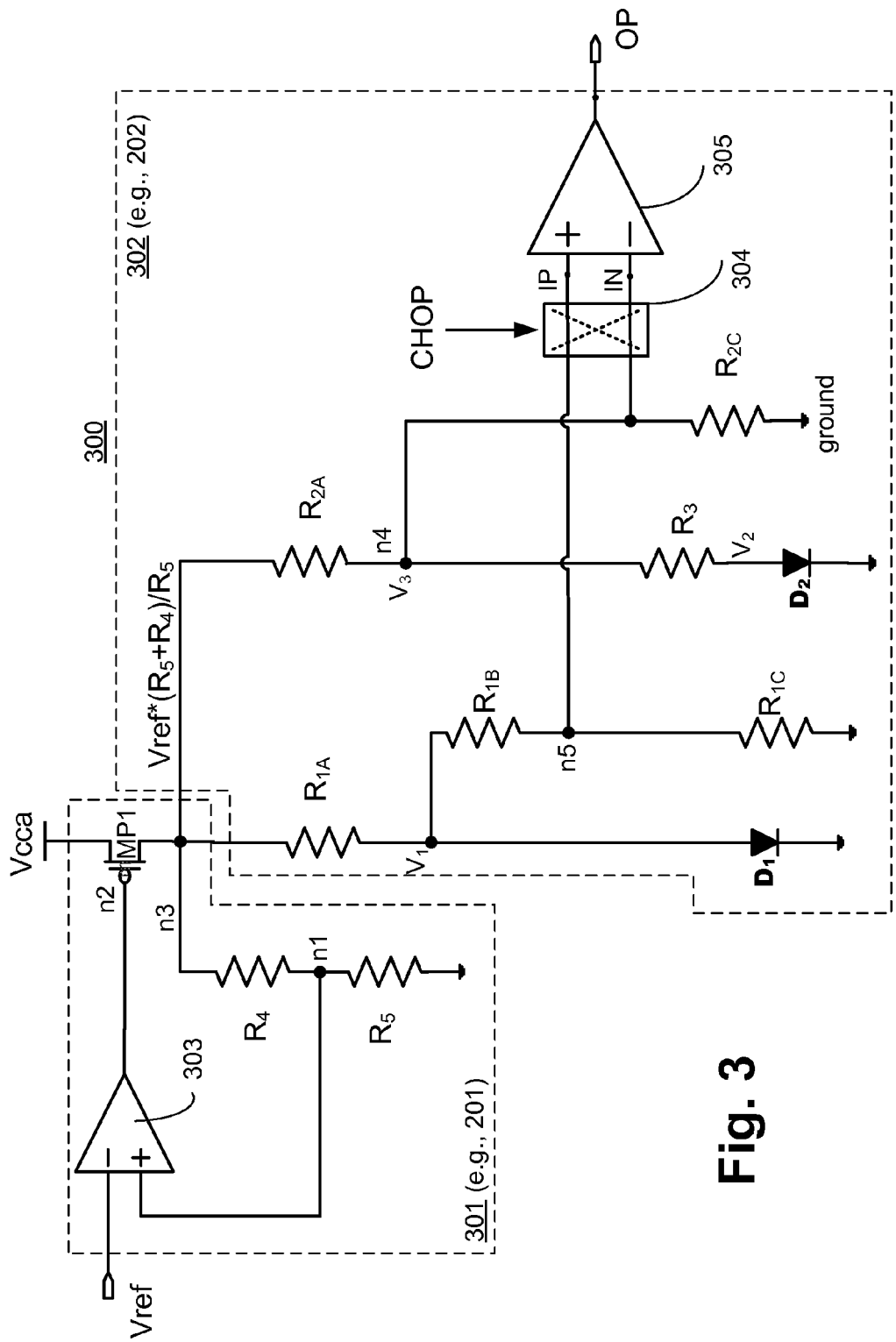
FIG. 3 illustrates a circuit of a signal level detector with a level translator and an open loop bandgap reference circuit, according to one embodiment of the disclosure.

FIG. 3 illustrates a Circuit 300 of a signal level detector with a level translator and an open loop bandgap reference circuit, according to one embodiment of the disclosure. It is pointed out that those elements of FIG. 3 having the same reference numbers (or names) as the elements of any other figure can operate or function in any manner similar to that described, but are not limited to such.

In one embodiment, Circuit 300 comprises LVR 301 and open loop bandgap reference generator 302. In one embodiment, LVR 301 comprises an amplifier 303, resistors $R_4$ and $R_5$, and p-type transistor MP1. In one embodiment, a reference voltage or a power supply, which is being sensed by Circuit 300, is received as an input (i.e., negative input) of amplifier 303. In one embodiment, LVR 301 shifts the detected reference voltage to a higher level, i.e., above the diode voltage, which increases the differential signal to be detected. In one embodiment, output n2 of amplifier 303 is coupled to gate terminal of MP1. In one embodiment, source terminal of MP1 is coupled to Vcca power supply. In one embodiment, drain terminal (i.e., node n3) of MP1 is the same as Vsense of FIG. 2. Referring back to FIG. 3, in one embodiment, resistors $R_4$ and $R_5$ are coupled in series between node n3 and ground. In one embodiment, the common node n1 of the coupled resistors $R_4$ and $R_5$ is coupled to another input (i.e., positive input) of amplifier 303.

In one embodiment, output voltage of LVR 301, Vsense, is proportional to Vref, according to the ratio of resistors $R_4$ and $R_5$. As such, Vsense is a multiple of Vref, and can be tuned to be in the range which is best for the diode/resistor matrix. In this embodiment, level-translation by LVR 301 decouples the sensed voltage, Vref, from the bandgap voltage, so that each can be tuned optimally. In one embodiment, output Vsense (or voltage on node n3) is the translated voltage of input voltage Vref, and is expressed as: Vsense=Vref($R_4$+$R_5$)/$R_5$. In one embodiment, resistors $R_4$ and $R_5$ have programmable resistances. For example, resistances of $R_4$ and $R_5$ can be adjusted or programmed by fuse or software. In one embodiment, by adjusting resistances of resistors $R_4$ and $R_5$, Vsense can be translated to different voltage levels. In one embodiment, the analog input supply, Vcca, can either be a charge-pumped supply from Vref, or an available analog supply voltage. In one embodiment, Vcca is set nominally between 1.2V to 1.5V.

In one embodiment, open loop bandgap reference generator 302 is any bandgap reference generator configured in an open loop fashion. While the embodiments discuss a resistive bandgap circuit configured in open loop, any type of bandgap reference generator may be used. In one embodiment, open loop bandgap reference generator 302 comprises chopper unit 304, comparator 305, resistors (i.e., $R_{1A}$, $R_{1B}$, $R_{1C}$, $R_{2A}$, $R_{2C}$, and $R_3$), and two components with an exponential dependency of current on voltage, shown as diodes $D_1$ and $D_2$. Here, instead of an amplifier, a comparator is used. Output OP of compactor 305 indicates whether Vref is above or below a bandgap reference. Resistors $R_{1A}$, $R_{1B}$, and $R_{1C}$ operate to bias diode $D_1$ at a first point of its range, while resistors $R_{2A}$, $R_{2C}$ and $R_3$ bias diode $D_2$ at a second point of its range. Resistors $R_{1B}$ and $R_{1C}$ form a voltage divider to produce a voltage proportional to the voltage across diode $D_1$, Resistors $R_{2A}$ and $R_{2C}$ form a voltage divider to produce a voltage proportional to $V_3$, the voltage across diode $D_2$ and resistor $R_3$.

In various embodiments, diodes $D_1$ and $D_2$ may be implemented as actual PN junction diodes, as the base-emitter junction of a bipolar transistor (BJT), or as another component with an exponential I(V) characteristic. The generic term "diode" here refers to these circuit elements. In some embodiments, a "string" of several diodes or base-emitter junctions may be formed in series, instead of a single diode or transistor.

In one embodiment, comparator 305 is a high accuracy comparator which is capable of resolving very small signals (e.g., 50 μV). In one embodiment, comparator 305 functions down to a low voltage (e.g., of 0.5V). In one embodiment, comparator 305 includes offset cancellation and gain-enhancement apparatus to enable low-voltage (e.g., 0.5V) operation. In one embodiment, chopper unit 304 is operable (via CHOP signal) to couple node n4 to node IP, and to couple node n5 to node IN. In one embodiment, chopper unit 304 is also operable to couple node n4 to node IN, and to couple node n5 to node IP. One technical effect of chopper unit 304 is to cancel random offset and noise related offsets in comparator 305.

Figure 4:
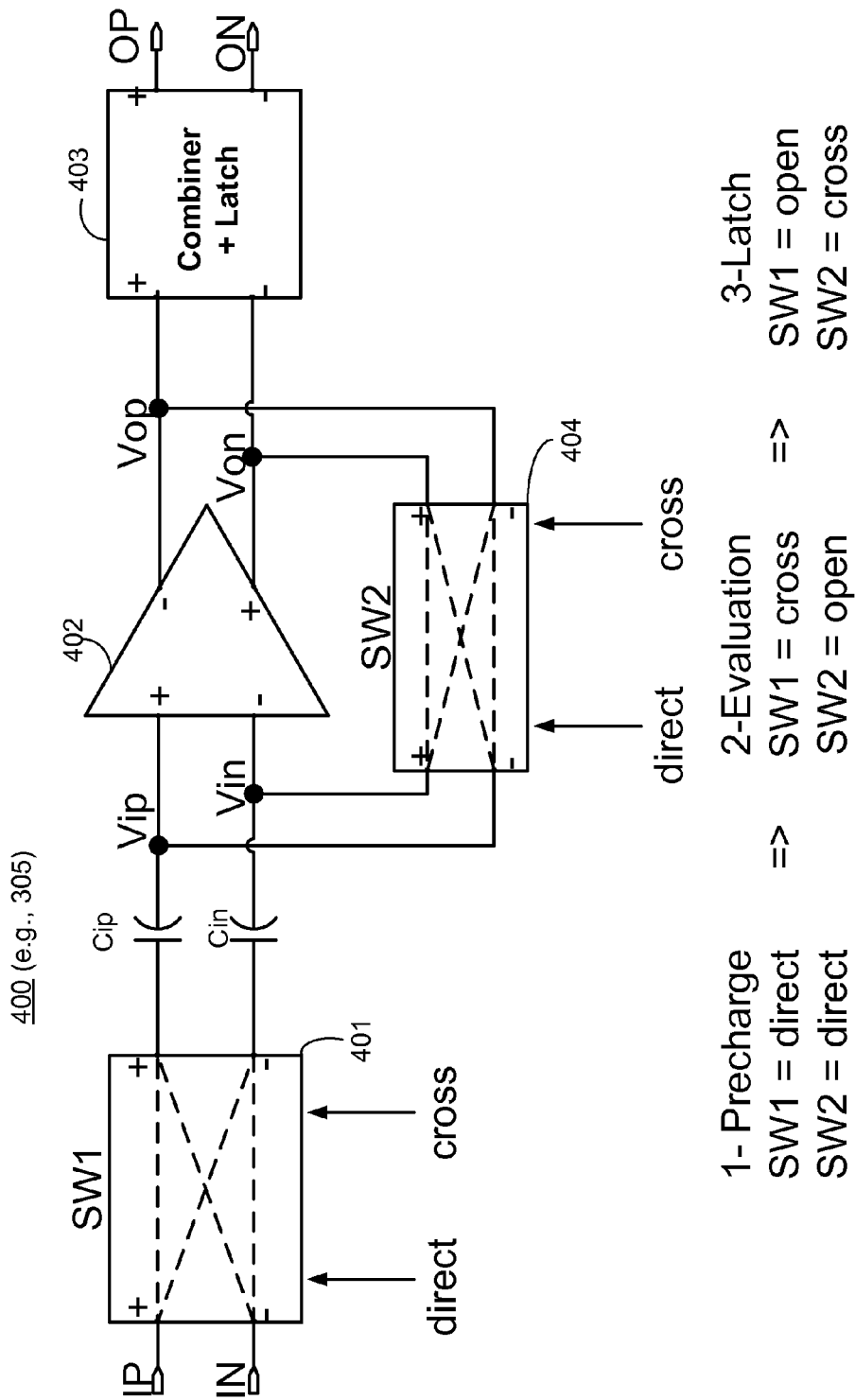
FIG. 4 illustrates a comparator with offset cancellation for use in the open loop bandgap reference circuit, according to one embodiment of the disclosure.

FIG. 4 illustrates a comparator 400 (e.g., 305) with offset cancellation for use in the open loop bandgap reference circuit, according to one embodiment of the disclosure. It is pointed out that those elements of FIG. 4 having the same reference numbers (or names) as the elements of any other figure can operate or function in any manner similar to that described, but are not limited to such.

In one embodiment, comparator 400 comprises first switch 401 (SW1), amplifier 402, Combiner and Latch 403, a second switch 404 (SW2), and capacitors Cip and Cin. In one embodiment, first switch 401 receives inputs IP and IN and couples them to capacitors Cip and Cin according to control signals direct and cross. In one embodiment, when signal direct is asserted and signal cross is de-asserted, node IP is coupled to capacitor Cip and node IN is coupled to node Cin. In one embodiment, when signal direct is de-asserted and signal cross is asserted, node IP is coupled to capacitor Cin and node IN is coupled to node Cip. In one embodiment, the other terminal of capacitors Cip and Cin are Vip and Vin, respectively, which are coupled to positive and negative terminals of amplifier 402 respectively. In this embodiment, capacitors Cip and Cin hold the input offset, and these capacitors are coupled in series between first switch 401 and amplifier 402.

In one embodiment, output (Vop and Von) of amplifier 402 is coupled to inputs of second switch 404 and Combiner and Latch 403. In one embodiment, second switch 404 receives inputs Vop and Von and couples them to nodes Vip and Vin according to control signals direct and cross. In one embodiment, when signal direct is asserted and signal cross is de-asserted, node Von is coupled to node Vin, and node Vop is coupled to node Vip. In one embodiment, when signal direct is de-asserted and signal cross is asserted, node Von is coupled to node Vip, and node Vop is coupled to node Vin. In one embodiment, Combiner and Latch 403 receives inputs Vop and Von and generates stable outputs OP and ON. In one embodiment, once the output signals OP and ON are at digital levels (for example, 10-90% of the voltage rails), Combiner and Latch 403 stores the resulting outputs in a memory structure, such as a latch. In one embodiment, the stored resulting output is output digitally to the outside "digital" chip (e.g., to an operating system, to an external pin, etc.).

There are three phases of operation of comparator 400. During the precharge stage, both first and second switches (401 and 404) are coupled directly (i.e., positive input terminal is coupled to positive output terminal, and negative input terminal is coupled to negative output terminal). In one embodiment, the offset of amplifier 402 is stored on the two input capacitors Cip and Cin. During the Evaluation stage, first switch 401 is crossed (i.e., positive input terminal is coupled to negative output terminal, and negative input terminal is coupled to positive output terminal), while second switch 404 is non-conducting. In this embodiment, the differential signal is now placed at the inputs Vip and Vin of amplifier 402.

In one embodiment, a differential output signal is developed at the two outputs Vop and Von. In one embodiment, this output signal is not very large, since the AC (alternating current) gain is not too high for a single stage. The third operation stage is the latch stage, where first switch 401 is non-conducting and second switch 404 is crossed. In one embodiment, the developed output signal from the Evaluation stage is transferred back to the input. In such an embodiment, a positive feedback is formed which causes the output to go to the rails, at which point the output is latched.

Here, IP/IN are also referred as Differential Input, Output of SW1 is referred as First differential output, VIP/VIN are referred as Second differential output, Vop/Von are referred as the third differential output, and OP/ON are referred as the fourth differential output.

Figure 5:
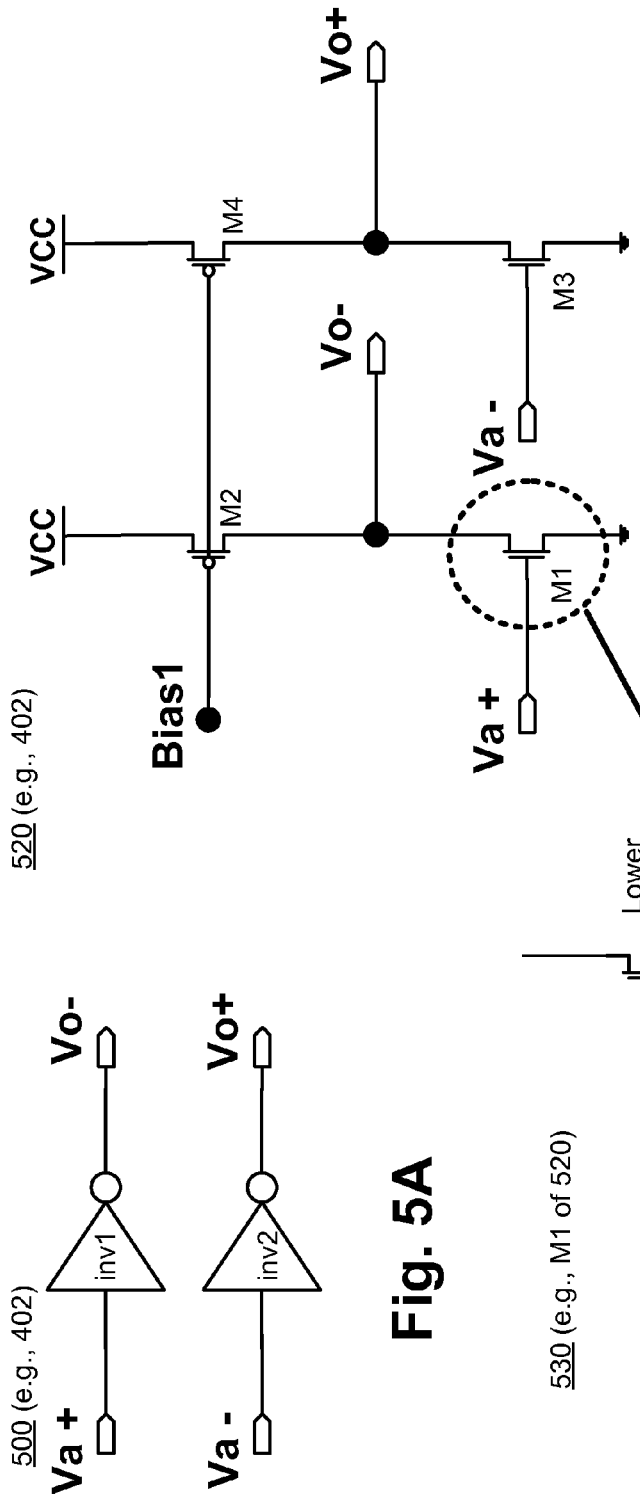
FIG. 5A-C illustrate amplifiers used for the amplifier with offset cancellation, according to some embodiments of the disclosure.

FIG. 5A and FIG. 5B illustrates implementations of inverting stages, according to one embodiment of the disclosure. It is pointed out that those elements of FIGS. 5A-B having the same reference numbers (or names) as the elements of any other figure can operate or function in any manner similar to that described, but are not limited to such. FIG. 5A illustrates an inverting stage 500 including CMOS inverters, according to one embodiment. FIG. 5B illustrates an inverting stage 520 including common source stages. In one embodiment, inverting stages 500 or 520 are used as amplifier with offset cancellation for the open loop bandgap reference circuit. Here, "inverting stages" may include both common-source (e.g., 520) and CMOS inverters (e.g., 500, and CMOS inverters which do not include common-source.

FIG. 5A illustrates Circuit 500 for implementing amplifier 402, according to one embodiment. In this embodiment, Circuit 500 comprises first inverter inv1 and second inverter inv2. In one embodiment, first inverter inv1 receives input Va+ (same as Vip) and generates output Vo− (same as Von). In one embodiment, second inverter inv2 receives input Va− (same as Vin) and generates output Vo+ (same as Vop). The inverters may constrain Circuit 500 to operate at a level of two threshold voltages plus enough overdrive on both N and P transistors of inverters inv1 and inv2. In one embodiment, Circuit 500 may be used when is it operating at supply voltages of 0.7V and higher.

FIG. 5B illustrates Circuit 520 for implementing amplifier 402, according to one embodiment. In one embodiment, Circuit 520 comprises common source amplifiers using n-type transistors M1 and M3 which are biased (via bias signal Bias1) by p-type transistors M2 and M4, respectively. In this embodiment, input Va+ (same as Vip) is received at the gate terminal of M1, and input Va− (same as Vin) is received at the gate terminal of M3. The drain terminals of M1 and M3 provide outputs Vo− (same as Von) and Vo+

(same as Vop). Compared to Circuit 500, Circuit 520 can operate near threshold voltages of M1 and M2.

FIG. 5C illustrates Circuit 530 for implementing amplifier 402, according to one embodiment. It is pointed out that those elements of FIG. 5C having the same reference numbers (or names) as the elements of any other figure can operate or function in any manner similar to that described, but are not limited to such. In one embodiment, Circuit 530 comprises n-type transistors M1B and M1A coupled together as shown.

Circuit 530 is a close-up of transistors M1 (or M2) of FIG. 5B. M1 and M2 in FIG. 5B can be implemented as a stack of several transistors in series, according to one embodiment. In one embodiment, to enhance the gain, Circuit 530 uses dual Vt (threshold) cascode structure. In one embodiment, transistor stacks are used to increase the effective channel length (L). In one embodiment, by using different Vt devices for M1 and M2 (of FIG. 5B) in a stack, cascoding effect in the stack is achieved. In one embodiment, the device closer to the drain is nominal Vt device, while the one closer to the source is a higher Vt device. For example, M1B is the lower Vt device while M1A is the higher Vt device.

In this embodiment, using a dual Vt device causes both of the devices in a stack to operate in saturation region. In one embodiment, the degree of saturation is the difference of the Vt's. In one embodiment, the effect can be enhanced even further by tapering the nominal device. For example, in one embodiment, three nominal Vt devices are stacked on top of a single high Vt device. The embodiment of FIG. 5C enhances Rout (output impedance). In one embodiment, the combination of mixed Vt and tapering can give gain improvement (e.g., 10 dB) to the common source amplifier with no headroom or variation cost.

Figure 6:
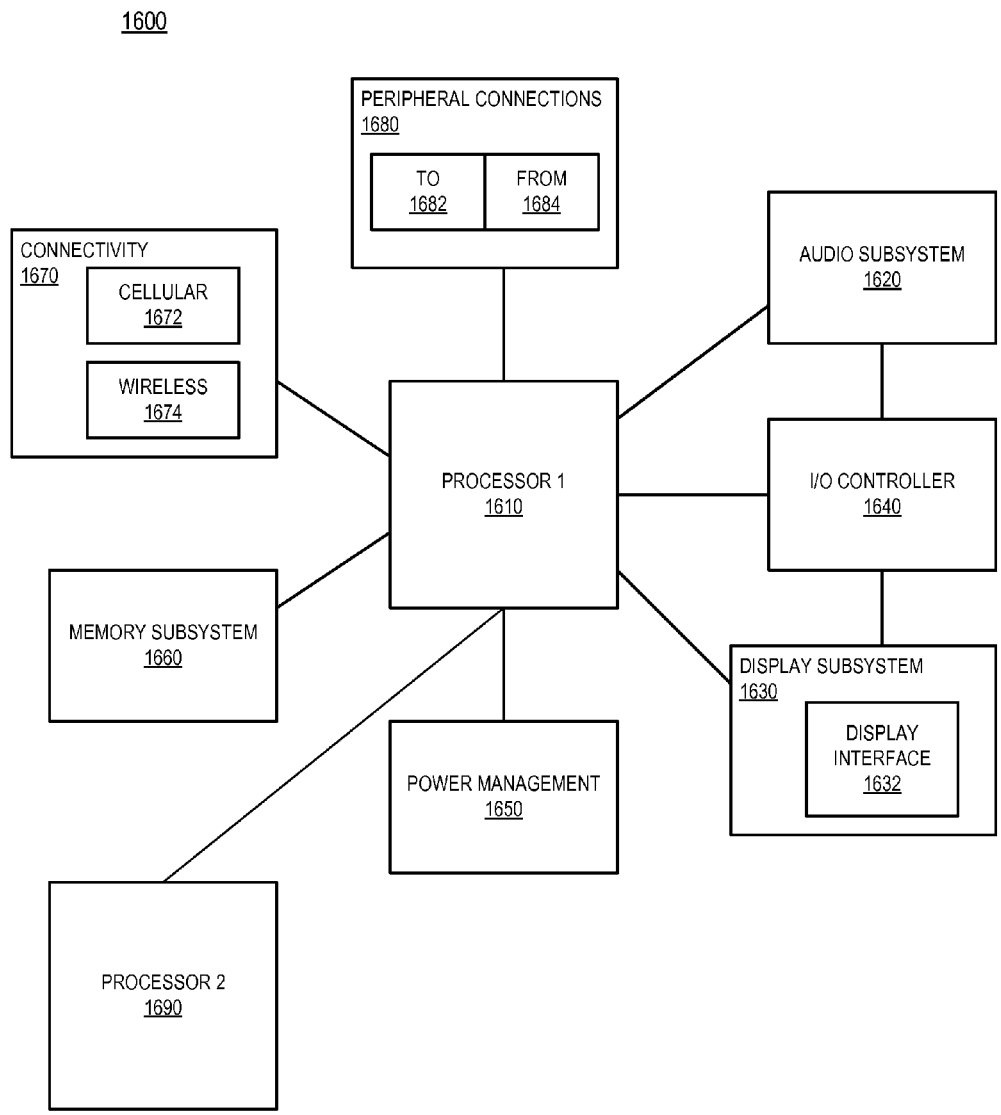
FIG. 6 is a smart device or a computer system or an SoC (System-on-Chip) with the signal level detector, according to one embodiment of the disclosure.

FIG. 6 is a smart device or a computer system or an SoC (system-on-chip) with the signal level detector, according to one embodiment of the disclosure. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with the signal level detector architecture described with reference to embodiments discussed. Other blocks of the computing device 1600 may also include apparatus of with the signal level detector described with reference to embodiments. The various embodiments of the present disclosure may also comprise a network interface within 1670 such as a wireless interface so that a system embodiment may be incorporated into a wireless device, for example, cell phone or personal digital assistant or a wearable device.

In one embodiment, processor 1610 (and/or processor 1690) can include one or more physical devices, such as microprocessors, application processors, microcontrollers, programmable logic devices, or other processing means. Processor 1690 may be optional. While the embodiment shows two processors, a single or more than two processors may be used. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, an apparatus is provided which comprises: an input for providing a first voltage signal; a level translator, coupled to the input, to translate the first voltage signal to a second input voltage, the second input voltage having a voltage level higher than a voltage level of the first voltage signal; and an open loop reference core coupled to the level translator, the open loop reference core to receive the second input voltage and to generate an output indicating whether the first voltage signal is above or below a reference level.

In one embodiment, the level translator comprises a linear voltage regulator. In one embodiment, the apparatus further comprises a charge pump to receive a first power supply and to generate a second power supply for the level translator. In one embodiment, the level translator to translate the first voltage signal to a second input voltage by a predetermined amount.

In one embodiment, the level translator further comprises: programmable devices to adjust the predetermined amount. In one embodiment, the open loop reference core is a bandgap reference circuit configured in an open loop configuration. In one embodiment, the bandgap reference circuit is a resistor based bandgap circuit. In one embodiment, the bandgap reference circuit comprises a chopper. In one embodiment, the bandgap reference circuit comprises a comparator with offset cancellation. In one embodiment, the comparator with offset cancellation comprises a first differential switch which is operable to directly connect or cross couple a differential input as a first differential output.

In one embodiment, the comparator with offset cancellation comprises: a pair of capacitors coupled in series with the differential output to generate a second differential output; and an amplifier to receive the second differential output and to generate a third differential output. In one embodiment, the comparator with offset cancellation comprises a second differential switch which is operable to buffer or cross couple the third differential output back to the second differential output.

In one embodiment, the comparator with offset cancellation comprises a combiner and a latch circuit to receive the third differential output and to generate a fourth differential output. In one embodiment, the amplifier of the comparator with offset cancellation comprises: a pair of inverting stages to receive as input the second differential output and to generate the third differential output. In one embodiment, the inverting stage is either a CMOS inverter or a common source amplifier. In one embodiment, each inverting stage comprises a cascode circuit having two transistors coupled in series, wherein each of the two transistors has a different threshold voltage.

In another example, a system is provided which comprises: a memory unit; a processor, coupled to the memory unit, the processor including a power on detector according to the apparatus discussed above. In one embodiment, the system further comprises a wireless interface for allowing the processor to communicate with another device. In one embodiment, the system further comprises a display unit.

In another example, a power-on detector is provided which comprises: a level translator to translate an input power supply to an input voltage, the input voltage to be translated to a voltage level higher than a voltage level of the input power supply; and an open loop bandgap reference core coupled to the level translator, the open loop bandgap reference core to receive the input voltage and to generate an output indicating whether the input power supply is above or below a bandgap reference level. In one embodiment, the level translator comprises a resistor divider to translate the input power supply by a predetermined amount.

In another example, a system is provided which comprises: a memory unit; a processor, coupled to the memory unit, the processor including a power-on detector as discussed above. In one embodiment, the system further comprises a wireless interface for allowing the processor to communicate with another device. In one embodiment, the system further comprises a display unit.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
an input for providing a first voltage signal;
a level translator, coupled to the input, to translate the first voltage signal to a second input voltage, the second input voltage having a voltage level higher than a voltage level of the first voltage signal; and
an open loop reference core coupled to the level translator, the open loop reference core to receive the second input voltage and to generate an output indicating whether the first voltage signal is above or below a reference level, wherein the open loop reference core is a bandgap reference circuit comprising a comparator with offset cancellation, the bandgap reference circuit configured in an open loop configuration without the output of the comparator being fed back to the second input voltage, and the comparator with offset cancellation comprises a first differential switch which is operable to directly connect or cross couple a differential input as a first differential output.

2. An apparatus comprising:
an input for providing a first voltage signal;
a level translator, coupled to the input, to translate the first voltage signal to a second input voltage, the second input voltage having a voltage level higher than a voltage level of the first voltage signal; and
an open loop reference core coupled to the level translator, the open loop reference core to receive the second input voltage and to generate an output indicating whether the first voltage signal is above or below a reference level, wherein the open loop reference core is a bandgap reference circuit configured in an open loop configuration, the bandgap reference circuit comprises a comparator with offset cancellation, and the comparator with offset cancellation comprises a first differential switch which is operable to directly connect or cross couple a differential input as a first differential output.

3. The apparatus of claim 2 further comprises a charge pump to receive a first power supply and to generate a second power supply for the level translator.

4. The apparatus of claim 2, wherein the level translator to translate the first voltage signal to a second input voltage by a predetermined amount.

5. The apparatus of claim 4, wherein the level translator further comprises programmable devices to adjust the predetermined amount.

6. The apparatus of claim 2, wherein the bandgap reference circuit is a resistor based bandgap circuit.

7. The apparatus of claim 2, wherein the bandgap reference circuit comprises a chopper.

8. The apparatus of claim 2, wherein the level translator comprises a linear voltage regulator.

9. The apparatus of claim 2, wherein the comparator with offset cancellation comprises:
a pair of capacitors coupled in series with the differential output to generate a second differential output; and
an amplifier to receive the second differential output and to generate a third differential output.

10. The apparatus of claim 9, wherein the comparator with offset cancellation comprises a second differential switch which is operable to buffer or cross couple the third differential output back to the second differential output.

11. The apparatus of claim 10 wherein the comparator with offset cancellation comprises a combiner and a latch circuit to receive the third differential output and to generate a fourth differential output.

12. The apparatus of claim 9, wherein the amplifier of the comparator with offset cancellation comprises:
a pair of inverting stages to receive as input the second differential output and to generate the third differential output.

13. The apparatus of claim 12, wherein the inverting stage is either a CMOS inverter or a common source amplifier.

14. The apparatus of claim 12, wherein each inverting stage comprises a cascode circuit having two transistors coupled in series, wherein each of the two transistors has a different threshold voltage.

15. A system comprising:
a memory unit;
a processor, coupled to the memory unit, the processor including a power on detector including:
an input for providing a first voltage signal;
a level translator, coupled to the input, to translate the first voltage signal to a second input voltage, the second input voltage having a voltage level higher than a voltage level of the first voltage signal; and
an open loop reference core coupled to the level translator, the open loop reference core to receive the second input voltage and to generate an output indicating whether the first voltage signal is above or below a reference level, wherein the open loop reference core is a bandgap reference circuit configured in an open loop configuration, the bandgap reference circuit comprises a comparator with offset cancellation, and the comparator with offset cancellation comprises a first differential switch which is operable to directly connect or cross couple a differential input as a first differential output; and
a wireless interface for allowing the processor to communicate with another device.

16. The system of claim 15 further comprises a display unit.

17. A power-on detector comprising:
a level translator to translate an input power supply to an input voltage, the input voltage to be translated to a voltage level higher than a voltage level of the input power supply; and
an open loop bandgap reference core coupled to the level translator, the open loop bandgap reference core to receive the input voltage and to generate an output indicating whether the input power supply is above or below a bandgap reference level, wherein the open loop reference core is a bandgap reference circuit configured in an open loop configuration, the bandgap reference circuit comprises a comparator with offset cancellation, and the comparator with offset cancellation comprises a first differential switch which is operable to directly connect or cross couple a differential input as a first differential output.

18. The apparatus of claim 17, wherein the level translator comprises a resistor divider to translate the input power supply by a predetermined amount.

* * * * *